Figure 1:
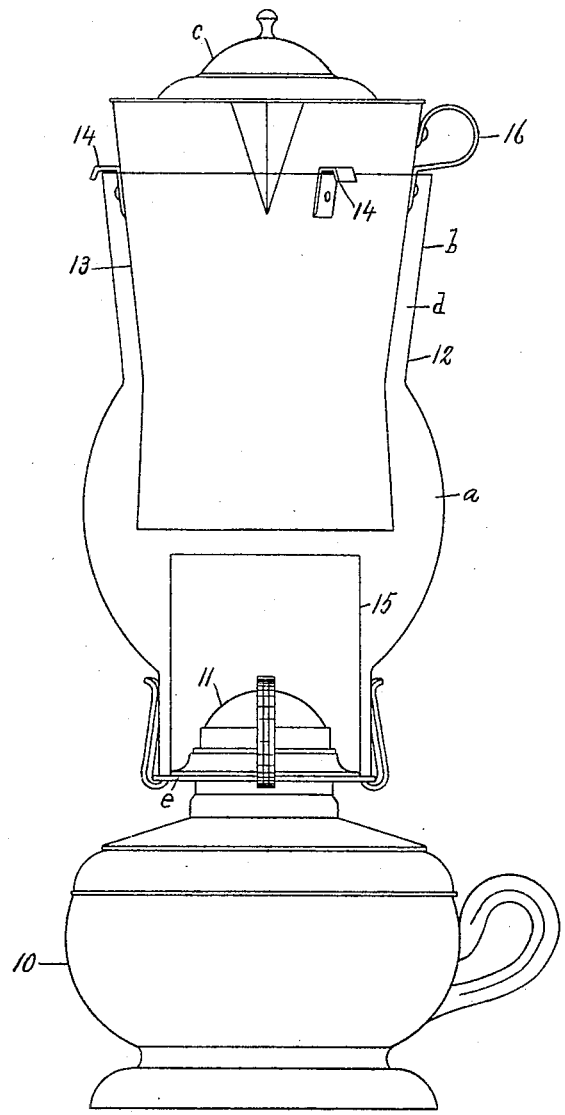

No. 805,554. PATENTED NOV. 28, 1905.
H. T. HYATT.
LAMP HEATER.
APPLICATION FILED DEC. 14, 1904.

2 SHEETS—SHEET 1.

Witnesses
J. S. Edmunds
A. Byrick.

Inventor
Henry T. Hyatt
By P. J. Edmunds
Attorney

No. 805,554. PATENTED NOV. 28, 1905.
H. T. HYATT.
LAMP HEATER.
APPLICATION FILED DEC. 14, 1904.
2 SHEETS—SHEET 2.
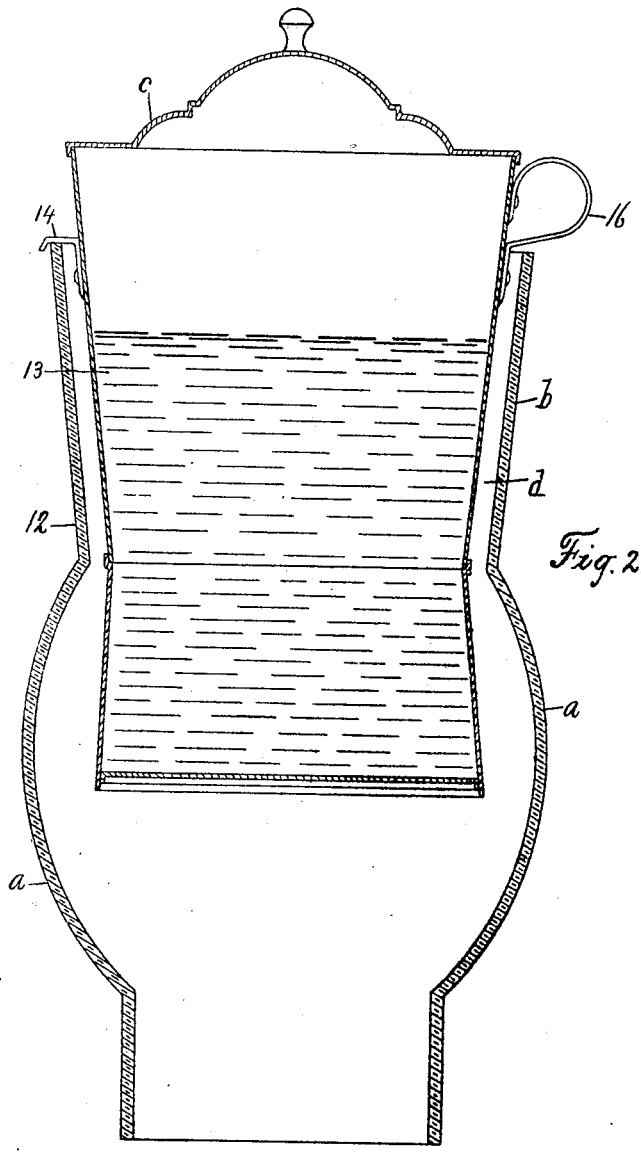
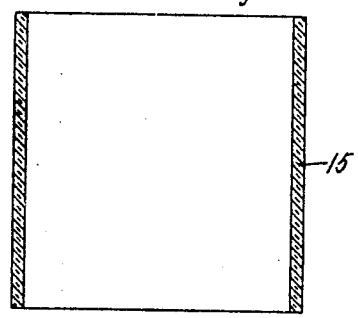
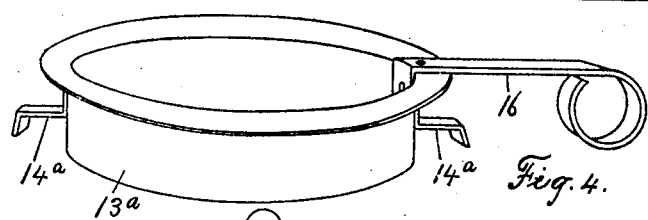
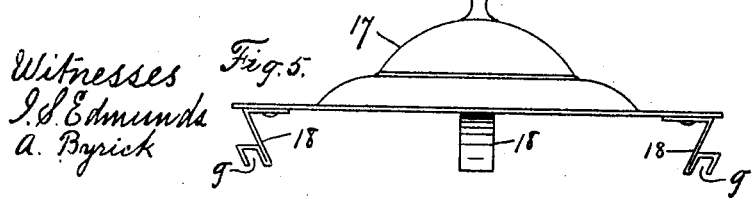
Witnesses
J. S. Edmunds
A. Byrick
Inventor
Henry T. Hyatt
By P. J. Edmunds
Attorney

UNITED STATES PATENT OFFICE.

HENRY T. HYATT, OF LONDON, CANADA.

LAMP-HEATER.

No. 805,554.

Specification of Letters Patent.

Patented Nov. 28, 1905.

Application filed December 14, 1904. Serial No. 236,791.

*To all whom it may concern:*

Be it known that I, HENRY T. HYATT, a subject of the King of Great Britain, and a resident of the city of London, in the county of Middlesex, in the Province of Ontario, Canada, have invented a certain new and useful Lamp-Heater, of which the following is a specification.

This invention relates to a lamp which may be used for heating as well as lighting, the object being to produce two distinct and desirable effects—viz., to spread the draft or air entering around the flame at an angle from the flame to the annulus of exit and cause the flame to spread, and by causing the air to take this course and slightly holding it at the annulus of exit a practically perfect and complete combustion takes place, the oxygen of the air mixing with the outer layers of the flame; and this invention consists of a globe formed with a spherical combustion-chamber and with a cylindrical exit and a vessel or receptacle located in the upper portion of said globe and supported from the upper rim thereof by arms in such a manner as to form in the upper exit portion of said globe an annulus of exit for the products of combustion; and it also consists of the improved construction and novel combination of parts, as will be hereinafter first fully set forth and described and then pointed out in the claim.

Reference being had to the accompanying drawings, Figure 1 is a side view of a lamp, illustrating my invention in connection therewith. Fig. 2 is an enlarged detail central vertical section of the large globe and the vessel or receptacle located therein, which is used for light, nursery, or culinary purposes. Fig. 3 is a detail central vertical section of a cylinder or tube open at both ends, which is located within the globe around the burner for the purpose of concentrating the heat on the vessel or receptacle to facilitate the rapid heating of the contents thereof. Fig. 4 is an enlarged detail perspective view of a shallow vessel or receptacle in which water or disinfectants may be heated for diffusing them throughout the atmosphere of the room. Fig. 5 is an enlarged detail side view of a cover which is supported above the upper rim of the globe for increasing the brilliancy of the light when the vessel or receptacle is removed when the lamp is not used for heating purposes.

In the accompanying drawings the numeral 10 designates the lamp, and 11 the burner thereof.

12 designates a glass globe resting on the gallery $e$ of the burner 11, and said globe is formed with a spherical combustion-chamber $a$ and cylindrical exit-chamber $b$.

13 designates a vessel or receptacle provided with a cover $c$.

14 designates arms secured to the side of the vessel or receptacle 13, which arms rest on the upper edge or rim of said globe 12 and support said vessel or receptacle 13 centrally within said globe 12, and when said vessel 13 is supported centrally within the cylindrical exit $b$ of the globe 12 an annulus of exit $d$ for the products of combustion is formed between said vessel 13 and said globe 12.

15 designates a tube formed of mica, glass, or asbestos, which tube is open at both ends, and one open end rests on the gallery $e$ of the burner inside of the globe 12, and said tube is adapted to terminate within a short distance of the bottom of the vessel or receptacle 13 when the latter is placed in proper position in said globe 12.

$13^a$ designates a shallow vessel or receptacle provided with arms $14^a$, similar to the arms 14 of the vessel or receptacle 13, and said vessels 13 and $13^a$ are each provided with a handle 16, which provides a convenient means for placing them in position on or removing them from the lamp.

17 designates a separate and independent cover provided with the legs 18, in which the recesses $g$ are formed, and said legs and recesses are fitted to and adapted to rest on the upper edge or rim of the globe 12 when the vessels 13 or $13^a$ are removed.

When the lamp is lighted and the vessel or receptacle 13 placed in the globe 12, as described and as shown in Figs. 1 and 2, the draft or air entering the spherical combustion-chamber $a$ at the burner around the flame spreads at an angle from the flame to the annulus of exit $d$ and across the bottom of the vessel or receptacle 13, which is deflected back again by the upper portion of the spherical globular chamber against the side of the vessel 13 below and before it passes to the annulus of exit $d$, and this annulus of exit being of smaller diameter than the spherical combustion compartment or chamber $a$ a slight block is formed at this point, and because of said block (the large size of the globe 12 making this effect possible, as well as giving free exit to the products of combustion to maintain the efficiency of the lamp) the air entering around the flame is not drawn straight up, as in an ordinary lamp-chimney, but spreads at an angle from the flame to the annulus of exit, causing the flame to spread, and by causing the air to take this course a practically perfect and complete combustion takes place, the oxygen of the air mixing with the outer layers of the flame. Thus the two distinct and desirable effects take place—viz., the spreading of the flame and the perfect and complete combustion even of the outer layers of the flame—giving practically a perfect and complete combustion.

Whereas in the ordinary lamp-chimney, which tapers to a central opening at the top, the draft is central and the air entering around the flame at the bottom is drawn almost directly upward because of the tapering sides, which taper from the bottom to the top, and because of the top being contracted, the enlargement of the glass gives very little of the spreading effect, because heated air takes the shortest course upward. For the same reasons when the vessels or receptacles 13 or $13^a$ are removed by placing the cover 17 on the top of the globe 12 and inserting the upper edge or rim of the globe 12 in the recesses $g$ of the legs 18 a light of great brilliancy and high candle-power is produced.

The addition of the tube 15 concentrates the heat on the bottom of the vessel or receptacle 13. This quickly heats the contents of said vessel and causes them to boil much more rapidly than if the tube 15 was not used.

By the use of the vessel or receptacle 13 a very efficient device is provided for light, nursery, or culinary purposes, and by the use of the shallow vessel or receptacle $13^a$ the air of a room may be readily and easily impregnated with moisture, with an antiseptic or disinfectant, or with a remedial agent.

While in the drawings forming part of this specification there is illustrated one form of construction embodying my invention which I prefer, it is understood that the elements therein shown may be varied or changed as to shape, proportion, and exact manner of assemblage without departing from the spirit of my invention.

Having thus described my invention, I claim—

A device of the class described comprising a globe, and means for supporting said globe on a lamp, said globe being formed with a spherical combustion-chamber and a cylindrical outwardly-flaring exit-chamber of smaller diameter than said spherical combustion-chamber, a tapered vessel or receptacle located in said globe, means for supporting said vessel in said globe, said vessel forming with said cylindrical exit-chamber of said globe a tapered annulus of exit for the products of combustion between said globe and said vessel, and a tube open at both ends supported at its lower open end on the burner within the globe, and its upper open end extending above the burner and to within a short distance of the bottom of said vessel.

In testimony whereof I have signed in the presence of the two undersigned witnesses.

HENRY T. HYATT.

Witnesses:
P. J. EDMUNDS,
A. BYRICK.